Sept. 13, 1932.  F. P. STRELITZ  1,877,616
FACE MASSAGING APPARATUS
Filed Sept. 18, 1929   2 Sheets-Sheet 2
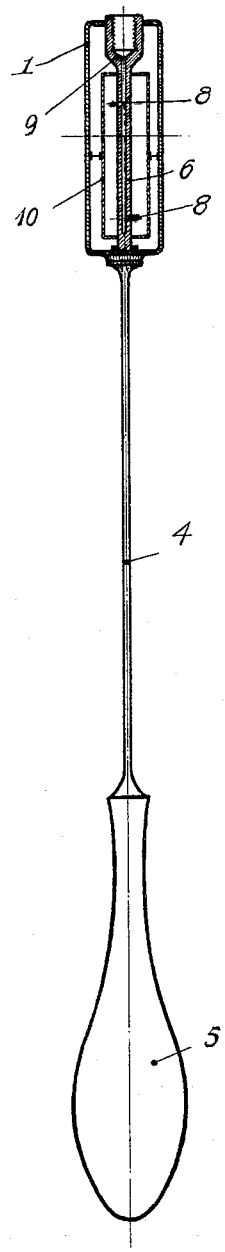
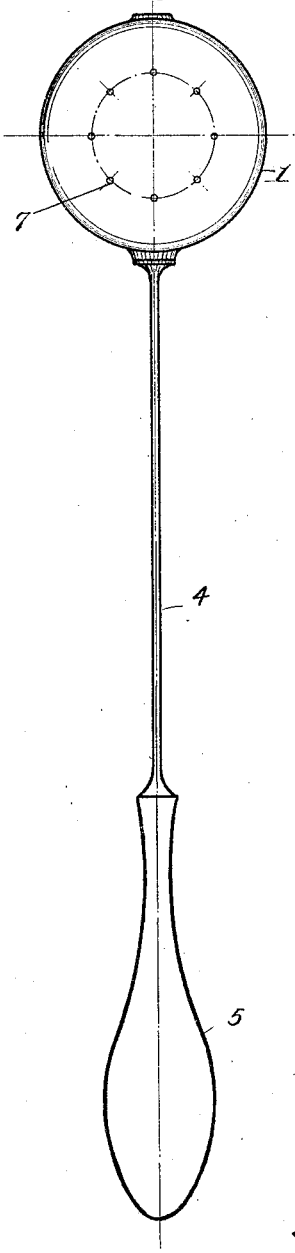
Inventor:
Franz Philipp Strelitz Patented Sept. 13, 1932

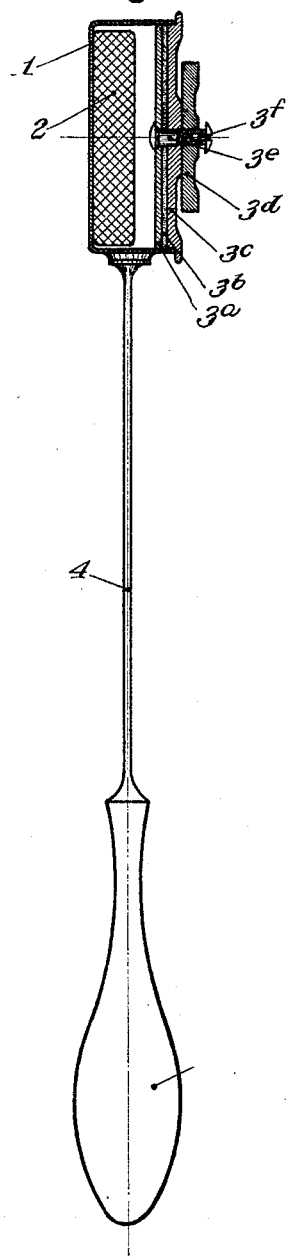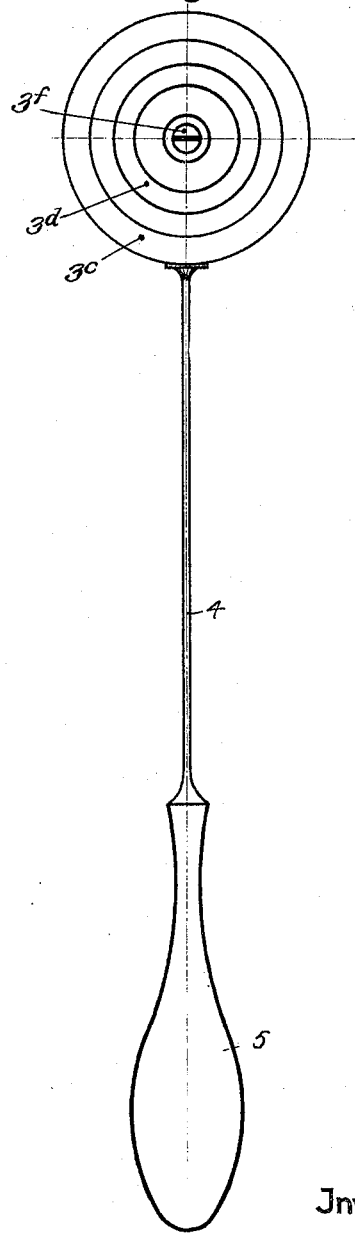

1,877,616

UNITED STATES PATENT OFFICE

FRANZ PHILIPP STRELITZ, OF BERLIN-HALENSEE, GERMANY

FACE-MASSAGING APPARATUS

Application filed September 18, 1929, Serial No. 393,453, and in Great Britain March 13, 1929.

This invention relates to a face massaging apparatus and consists in the provision of a substantially flat casing mounted resiliently on a handle so that it can be used for slapping the face and the neck, means being provided for maintaining the casing at a very low temperature in order to counteract the heat generated by the slapping.

Fig. 1 of the accompanying drawings represents a sectional view of an apparatus according to the invention, Fig. 2 is an elevation of the same at right angles to Fig. 1, Fig. 3 is a sectional view of a modified construction and Fig. 4 is an elevation of the device shown in Fig. 3 at right angles thereto.

The device consists of a flat casing 1 which is connected by means of a long resilient stem 4 to a handle 5 whereby the casing can be conveniently used for slapping the face and the neck. In order to counteract the heat generation produced by the slapping, means are provided for maintaining the casing at a very low temperature. This may be effected, as shown in Fig. 1, by the introduction into the casing of a block 2 of ordinary ice, frozen carbonic acid gas or other cooling medium. In this instance the casing is closed at one side by means of a detachable lid comprising two plates $3a$ and $3c$ and an intervening rubber or like disc $3b$. A clamp screw $3e$ fitted with a large, easily operated nut $3d$ is used for compressing the rubber disc between the plates and thus forcing the edges thereof to the casing 1 so as to produce a tight seal. A headed screw $3f$ is fitted in the end of the screw $3e$ so as to retain the nut $3d$ on the latter. The plate $3c$ is flanged for engagement with the edge of the casing.

The arrangement may be modified as shown in Figs. 3 and 4 with a view to effecting the cooling of the casing by the mere introduction therein of carbonic acid gas. For this purpose a pipe 6 provided with perforations 8, is arranged, preferably in a diametral position, within the casing 1 and fitted at one end with a socket 9 whereby it can be connected to a supply of liquefied carbonic acid gas. A vessel 10 of gauze or porous material encloses the pipe 6 so as to intercept the expanding gas and turn it into snow which will then maintain the casing cold for a considerable time. The casing 1 may be provided with perforations 7 through which the regenerated gas can escape.

The casing may be covered with cotton wool soaked in a mixture of witch-hazel and lavender water or the like, the cotton wool being covered and held in position on the casing by a piece of butter muslin or the like which is fastened to the casing by means of a rubber band.

The handle 5 is either made of or covered with insulating material.

The simultaneous slapping and cooling of the face muscles will have a very beneficial effect on the skin.

I claim:—

A face massaging apparatus comprising a substantially flat perforated casing, a perforated pipe in said casing, means for connecting said pipe to a supply of liquefied carbonic acid gas, a porous vessel arranged so as to enclose the pipe inside the casing, a resilient stem connected with the casing, and an operating handle connected to the free end of said stem.

FRANZ PHILIPP STRELITZ.